United States Patent [19]
Ruben et al.

[11] Patent Number: 5,335,033
[45] Date of Patent: Aug. 2, 1994

[54] LENSLESS CAMERA VIEWFINDER

[75] Inventors: Paul L. Ruben, Penfield; William L. Burnham, LeRoy, both of N.Y.

[73] Assignee: Eastman Kodak Company, Rochester, N.Y.

[21] Appl. No.: 919,422

[22] Filed: Jul. 23, 1992

[51] Int. Cl.⁵ .............................................. G03B 13/02
[52] U.S. Cl. .................... 354/219; 354/199; 354/222; 354/166
[58] Field of Search ................ 354/219, 199, 222, 166

[56] References Cited

U.S. PATENT DOCUMENTS

| | | | |
|---|---|---|---|
| 1,140,108 | 5/1915 | Brown | 354/219 |
| 3,731,586 | 5/1972 | Meazza . | |
| 4,216,589 | 8/1980 | Beaver . | |
| 4,751,536 | 6/1988 | Ohmura . | |
| 4,758,852 | 7/1988 | Maejima . | |
| 4,766,451 | 8/1988 | Fujimura et al. . | |
| 4,801,957 | 1/1989 | Vandemoere . | |
| 4,804,987 | 2/1989 | Arai . | |
| 4,812,863 | 3/1989 | Ohmura . | |
| 4,833,495 | 5/1989 | Ohmura . | |
| 4,855,774 | 8/1989 | Ohmura . | |
| 4,866,470 | 9/1989 | Arai . | |
| 4,891,658 | 1/1990 | Goddard | 354/219 |
| 4,893,141 | 1/1990 | Smart | 354/219 |
| 4,896,178 | 1/1990 | Ohmura . | |
| 4,903,058 | 2/1990 | Schappler . | |

FOREIGN PATENT DOCUMENTS 6708486 3/1968 Netherlands .

*Primary Examiner*—Monroe H. Hayes
*Attorney, Agent, or Firm*—M. Lu Kacher; S. Short

[57] ABSTRACT

A dual function viewfinder presents to a photographer the frame of a picture being taken by the camera having the viewfinder and enables the photographer to point the camera to the center of the frame. The frame is outlined by the front perimeter of an opening which extends between the rear and the front of the camera. Centered within the opening is a tubular member which blocks a portion of the field of view except when the camera is pointed so that the pupil of the photographer's eye is centered. The line of sight from the pupil to the center of the framed field of view is then along the axis of the tubular member. This condition is indicated by the walls of the member becoming virtually imperceptible to the photographer. No refracting optical elements, such as lenses, are required in the viewfinder; making the viewfinder low in cost and, therefore, especially suitable for single use cameras.

21 Claims, 3 Drawing Sheets

LENSLESS CAMERA VIEWFINDER

The present invention relates to viewfinders and particularly to viewfinders for cameras which do not require, in the viewfinder, any refracting optical elements, such as lenses.

The invention is especially suitable for use in providing a viewfinder for cameras which are thin, i.e., narrow in the dimension thereof between the front and back sides of the camera. The front side is pointed toward the object space where the object or scene to be photographed is located. A viewfinder provided in accordance with the invention is particularly applicable for incorporation in single use cameras, since it avoids the need for refractive optical elements, such as lenses, and the added cost such refractive optical elements represent.

Many cameras are equipped with viewfinders which delineate the frame by means of an opening which extends through the camera. This opening may taper outwardly from the back towards the front of the camera, or have a smaller aperture in the back side than the front side of the camera, or have cross hairs in windows in the front and back sides of the camera. Such viewfinders provide either no indication that the camera is pointed properly towards, for example, the center of the object or scene being photographed. The problem is exacerbated when the camera body is narrow between its front and back sides (in so-called compact cameras which have become popular with photographers). Then the tendency may exist for the photographer to move his or her eye to center the field of view in the frame. However, the eye will not be on the center line of the viewfinder. The camera is then pointed in the wrong direction (away from the object), and a significant part of the desired field of view can be truncated in the resulting photograph. The problem is further exacerbated when low cost is a significant objective of the viewfinder design, as when the viewfinder is intended for use in single use cameras. Then a lensless viewfinder is desirable. Heretofore lensless viewfinders have suffered from the lack of facilities for pointing the camera so as to center the eye of the photographer (the pupil of the eye) accurately along the center line of the viewfinder.

Examples of cameras having viewfinders which lack centering capability are in the following patents on single use cameras: Fujimura et al., U.S. Pat. No. 4,766,451 issued Aug. 23, 1988 and Vandemoere, U.S. Pat. No. 4,801,957 issued Jan. 31, 1989. A camera with a viewfinder having a pyramidal opening tapering inwardly from the front towards the back side of the camera is shown in Dutch patent 6708486 (March 1968). Beaver, U.S. Pat. No. 4,216,589, Aug. 12, 1980 shows a viewfinder with cross hairs in front and rear windows and shows that the distance between the windows must be at least several inches for accurate pointing along the cross hairs. Other patents which use tapered openings or larger front than rear windows are: Meazza, U.S. Pat. No. 3,731,586, May 8, 1972; Ohmura, U.S. Pat. No. 4,751,536, Jun. 14, 1988; Maejima, U.S. Pat. No. 4,758,852, Jul. 19, 1988; Arai, U.S. Pat. No. 4,804,987, Feb. 14, 1989; Ohmura, U.S. Pat. No. 4,812,863, Mar. 14, 1989; Ohmura, U.S. Pat. No. 4,833,495, May 23, 1989; Ohmura, U.S. Pat. No. 4,855,774, Aug. 8, 1989; Arai, U.S. Pat. No. 4,866,470, Sep. 12, 1989; Ohmura, U.S. Pat. No. 4,896,178, Jan. 23, 1990; and Schappler, U.S. Pat. No. 4,903,058, Feb. 20, 1990.

It is therefore the general object of the present invention to provide an improved viewfinder especially for use in cameras.

It is another object of the invention to provide an improved camera viewfinder which is made low in cost by eliminating refracting optical elements, such as lenses, while providing accurate definition of the field of view which is being photographed, both as to the center and the outside limits thereof.

It is a more specific object of the invention to provide an improved camera viewfinder, without refracting optical elements, which is small in size so that it can be accommodated within the body of modern compact cameras and yet provides accurate framing of the picture both at the center and the outer limits of the field of view thereof.

It is a further object of the present invention to provide an improved lensless viewfinder which can be coupled to a zoom lens and tracks the size of the frame over the range of focus of the zoom lens and provides accurate framing of the picture both at the center and outer limits of the frame.

Briefly described, a viewfinder in accordance with the invention is adapted to be incorporated in a camera having a body and a lens which is used by a photographer in taking a picture. The picture may be of an object or scene in object space in front of the camera and the picture is in a frame defined by the viewfinder. The viewfinder provides the dual function of indicating to the photographer the limits of the frame and also centers the photographer's eye and particularly the pupil of his or her eye so that the camera is properly pointed. The viewfinder makes use of means for presenting to the pupil of the photographer's eye, when the camera is pointed toward object space, a view, the perimeter of which is the perimeter of the frame of the picture. The viewfinder also includes means for blocking a portion of the view; the blocking means becoming virtually imperceptible to the photographer when the camera is pointed to bring the center of the frame along the line of sight between the pupil and the object or scene.

The foregoing and other objects' features and advantages of the invention as well as presently preferred embodiments thereof will become more apparent from a reading of the following description in connection with the accompanying drawings in which.

Figure 1:
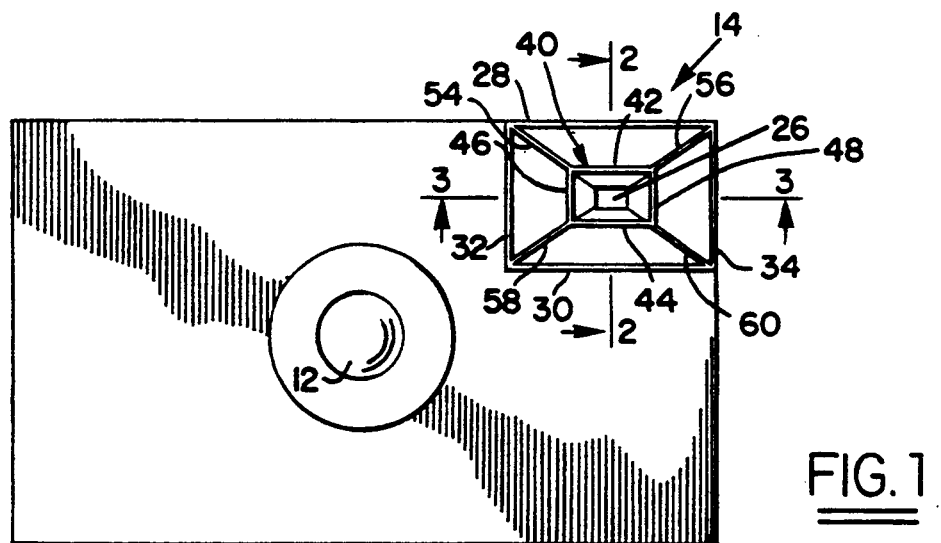
FIG. 1 is a front elevation of a camera incorporating a viewfinder in accordance with an embodiment of the invention.
Figures 2, 3:
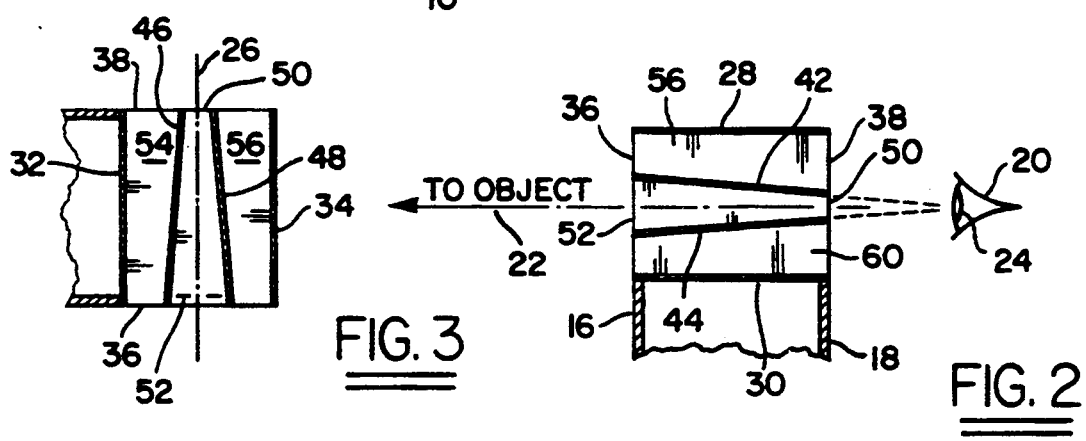
FIG. 2 is a fragmentary sectional view along the line 2—2 in FIG. 1.
FIG. 3 is a fragmentary sectional view along the line 3—3 in FIG. 1.

Referring to FIGS. 1 through 3 there is shown a camera 10 having a picture taking lens 12 and a viewfinder 14. The viewfinder is shown positioned in a corner of the body of the camera. It may be positioned elsewhere inside or alongside the body of the camera. The front side 16 of the camera faces object space where the object or scene to be photographed is located. The back side 18 of the camera faces the photographer's eye 20. A line of sight 22 from the pupil 24 of the eye 20, which is along the central axis 26 of the viewfinder, crosses the optical axis of the lens in the object space. In fixed lens cameras this crossover may be 8 to 15 feet in front of the camera's front side 16.

The viewfinder 14 has rectangular top and bottom walls 28 and 30 and rectangular side walls 32 and 34. These may be separate walls or the sides of a rectangular aperture in the camera body which are formed by the body itself when it is fabricated, as for example by molding from plastic material. The length of the viewfinder is defined by the length of the top and bottom walls 28 and 30 (which is from front to back of the camera). The width of the viewfinder is defined by the width of the top and bottom walls 28 and 30 (which is from left to right in FIG. 1). The height of the viewfinder is defined by the height of the side walls 32 and 34. Internally the walls 28, 30, 32 and 34 define a rectangular aperture having a front window 36 and a back window 38. These windows are rectangular and have the same aspect ratio as the frame of the picture to be taken. For 35 mm format this may be a ratio of length to height of 3 to 2. The perimeter of the front window 40 defines the frame; the rear window being out of focus of the eye 20 when the eye is close to the back side of the camera during picture taking.

Figure 7:
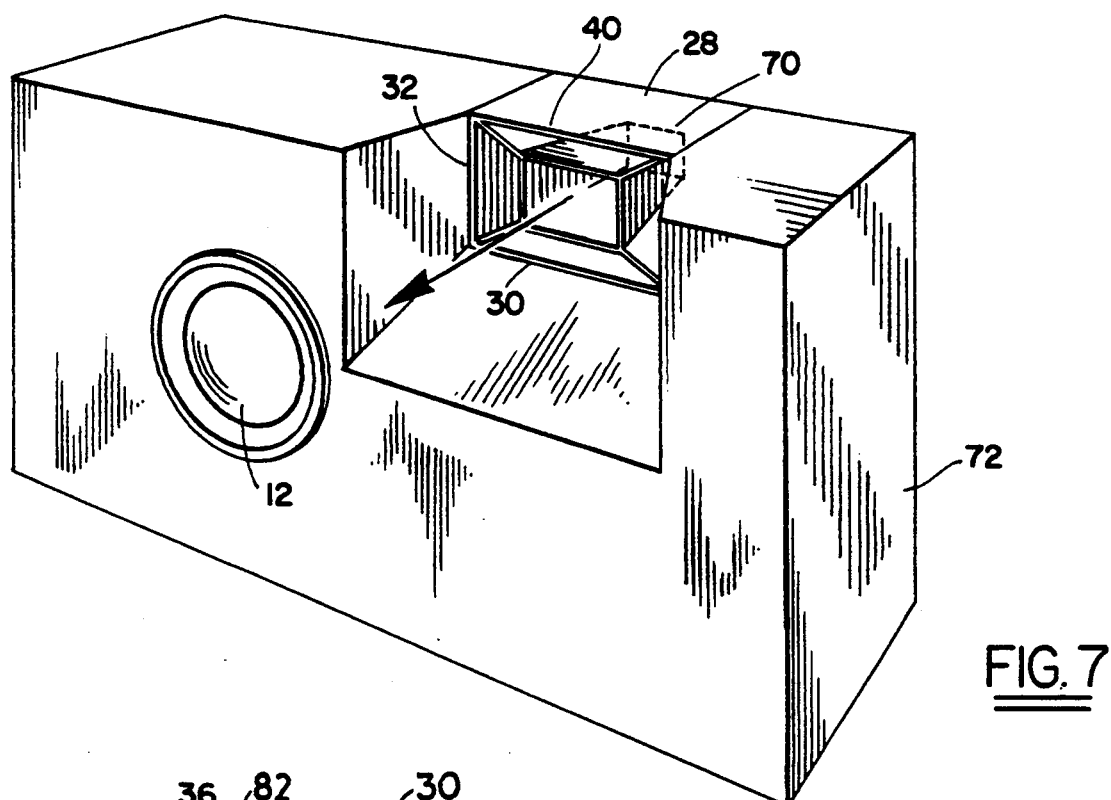
FIG. 7 shows a viewfinder in accordance with still another embodiment of the invention.

The thickness or length of the viewfinder is preferably equal to the thickness of the camera. The camera may be a modern compact camera having a thickness of from approximately 1 to 1½ inches between the front and back sides 16 and 18 thereof. It may be desirable for reasons of styling or weight reduction to use a viewfinder having a thickness dimension smaller than the thickness of the camera. Such a viewfinder may be essentially of the same design shown in FIG. 1 but smaller as to its length, width and thickness. Such a viewfinder is illustrated in FIG. 7.

In order to insure that the camera is pointed properly towards the center of the frame, and particularly in order to insure that the eye 20 (See FIG. 2) is not offset but that the line of sight 22 extends from the pupil 24 to the center of the frame and coincides with the central axis 26 of the viewfinder, means are provided for controlling the pointing of the camera as well as for framing the picture. The front window 36 and the aperture or hole through the viewfinder presented by the sides 28 to 34 provide for framing. The pointing function is provided by means which block the field of view, but become virtually imperceptible when the camera is pointed to bring the center of the frame along the line of sight between the pupil 24 and the object or scene in the object space. The blocking means shown in FIGS. 1 to 3 is provided by a tubular member or body 40 having top and bottom walls 42 and 44 and side walls 46 and 48. These walls are generally trapezoidal and define a pyramidal tube having rectangular entrance and exit ends 50 and 52. The tubular member 40 is defined by the pyramidal tube in the embodiment of the invention shown in FIGS. 1-3 and by tubes identified by reference numeral 40 or 102 in the embodiments shown in FIGS. 7-12. These tubular members 40 and 102 are of a length which is a substantial portion of the length of the viewfinder. The length of the viewfinder is measured by the distance along the line of sight 22 between the front windows 36 and rear window 38. In other words cross sections perpendicular to the line of sight 22 or central axis 26 are rectangles. These rectangles have the same aspect ratio as the frame defined by the top and bottom walls 28 and 30 and the side walls 32 and 34 of the framing aperture. The body 40 is rotationally symmetric about the axis 26, in that the radial distances from the axis to the sides along lines intersecting the axis are equal. The tubular body 40 has a central axis which coincides with the axis 26. It is positioned in the framing aperture by four plates 54, 56, 58 and 60 which define a spider. These plates extend between the corners of the framing aperture and the corners of the pyramidal tubular body 40. Other structures which provide sufficient rigid support for the body 40 may be used which may be either a single strut or struts disposed along the horizontal and vertical center lines of the pyramidal body and extending along the planes of these center lines to the walls 28 to 34. Examples of other support structures are shown in other FIGs hereof.

Figure 9:
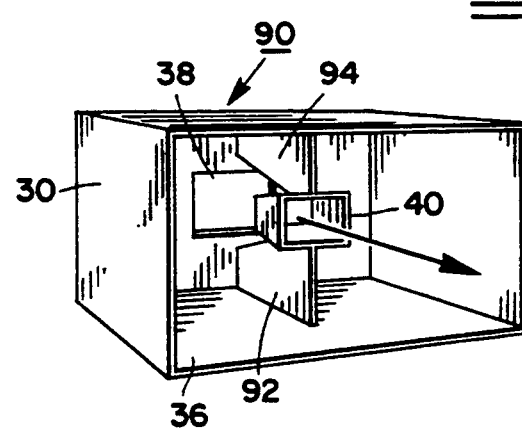
FIG. 9 shows a viewfinder in accordance with still another embodiment of the invention.

It is desirable that the exit end of the body 40 extend to and be disposed in the front window 36. However, the body may be located within the framing aperture and be of less width than the distance between the front and back windows 36 and 38 as shown in FIG. 9. Also, the back window 38 need not be entirely open as long as it has an opening which frames the entrance aperture 50 as shown in FIG. 9. Then the back 18 of the camera body may be extended to form the back side of the viewfinder and to provide more rigid support by being connected to the plates or ribs, such as the ribs 54 to 60 which support the body 40.

Figure 8A:
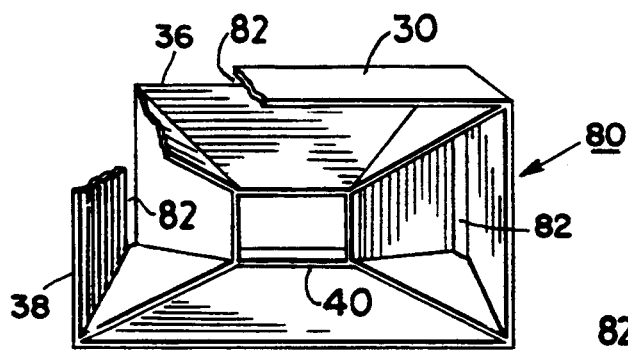
FIGS. 8A & 8B show a viewfinder in accordance with still another embodiment of the invention from the rear and front, respectfully.
Figure 8B:
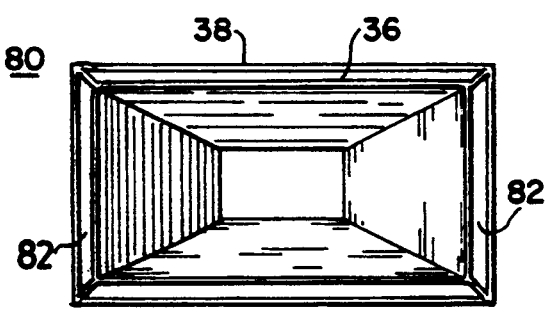

The tubular body 40 blocks approximately 30 percent of the area of the front window 36 in the embodiment shown in FIGS. 1 to 3. It may be designed to block 30 to 50 percent. In the event that an artificial reticle is desired, the blocking area of the body may be extended as by increasing the angle between the walls 42 and 44 and between the walls 46 and 48 (See FIG. 8A and B) so that the exit end 52 blocks approximately 90 percent of the window 36. This leaves a gap 82 as shown in FIG. 8. The thickness of walls of the tubular body 40 may be increased so that the walls of the tubular body remain somewhat perceptable when the viewfinder is aligned. The gap transmits light from the object space and is perceived as a reticle, and can be used by the photographer in the same way as a scribed reticle in a viewfinder having lenses.

The angle between the walls determines the location (or design position) of the pupil 24 of the eye 20 with respect to the back side 18 of the camera body and the rear window 38. In the embodiment shown in FIGS. 1 to 3 that distance may be 18 to 20 mm which is desirable for photographers who wear eyeglasses. The angle of the tubular body towards the line of sight 22 (axis 26)

may vary to provide the apex of the extension of the walls 42 to 48 at from 12 to 20 mm from the back side 18. In other words the pupil is at the apex of the tubular body (truncated pyramid or truncated cone—see FIGS. 10 and 11).

When the line of sight is centered and the eye is positioned accurately at the design position, the camera is pointed to the center of the frame. Then the walls 42 to 48 of the tubular body 14 become virtually imperceptible. This indication enables the camera to be pointed accurately and the field of view to appear virtually unobscured at the center of the frame. It is important that the walls of the tubular body taper inwardly from the exit to the entrance ends thereof (or away from the object space). If the walls were parallel they would always obscure a portion of the field of view. The tapered configuration provides the photographer with an accurate indication (depending upon whether the walls are or are not perceptible) showing that the camera is pointed properly. When the walls disappear (become essentially imperceptible) the frame is centered and the center is along the line of sight 22.

Figures 4, 5:
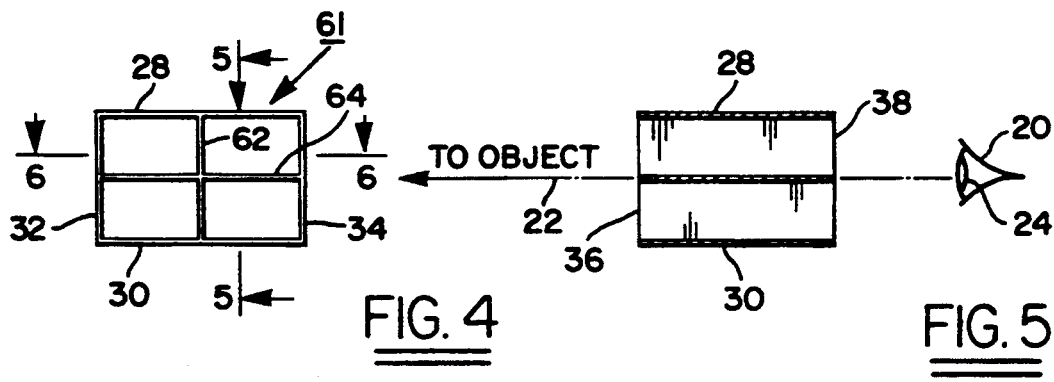
FIG. 4 is a front elevation of a viewfinder, in accordance with another embodiment of the invention, which may be used instead of the viewfinder shown in FIG. 1 in the camera shown therein.
FIG. 5 is a sectional view of the viewfinder of FIG. 4 taken along the line 5—5 in FIG. 4.
Figure 6:
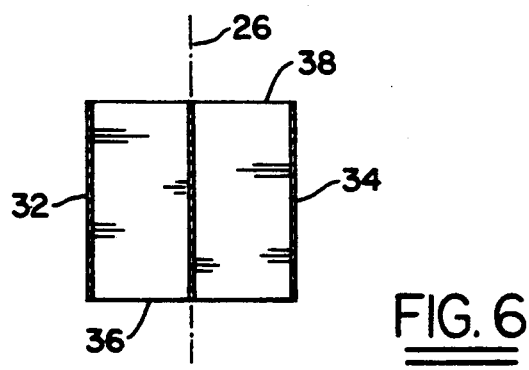
FIG. 6 is a sectional view of the viewfinder shown in FIG. 4 taken along the line 6—6 in FIG. 4.

Referring to FIGS. 4 to 6 there is shown a viewfinder 61 having a rectangular aperture defined by top and side walls which are indicated by the same reference numerals as corresponding parts in FIGS. 1 to 3. The pointing means, which also operates to block the field of view when the camera is not pointed to the center thereof along the line of sight 22 and which becomes virtually imperceptible when the camera is accurately pointed, is provided by orthogonal plates 62 and 64 which bisect the framing aperture defined by the walls 28 to 34. These plates are very much thinner than the height or length dimensions of the framing aperture, which is the rectangular opening through the viewfinder between the windows 36 and 38. The plates 62 and 64 are desirably sufficiently thick to be rigid. The vertical plate 62 bisects the top and bottom walls 28 and 30 and the horizontal plate 64 bisects the side walls 32 and 34. Thus, the intersection of the plates is along a line coincident with the central axis 26. When this central axis is along the line of sight 22, the plates become virtually imperceptible. This effect indicates to the photographer that the camera is pointed at the center of the frame.

Referring to FIG. 7 there is shown the viewfinder 70 which is shorter than the thickness of the camera body 72. The parts of the viewfinder which are the same, but smaller in size, than the viewfinder shown in FIGS. 1 to 3 are indicated by like reference numerals.

Similarly, the parts shown in FIG. 8, which shows the viewfinder 80 defining the virtual reticle 82 and which are similar to those shown in FIGS. 1 to 3, are indicated by like reference numerals.

Referring to FIG. 9, it will be noted that the truncated pyramidal tubular body 40 is shorter than the distance between the front and rear windows 36 and 38 of the framing aperture and the rear window is defined by a rectangular aperture which frames the entrance aperture of the body. The FIG. 9 viewfinder 90 also shows a pair of vertical ribs 92 and 94 which support the tubular body 40.

Figure 10:
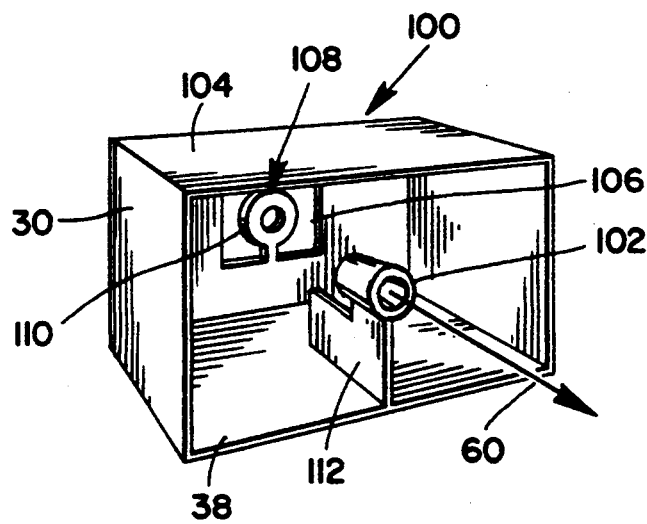
FIG. 10 shows a viewfinder in accordance with still another embodiment of the invention.
Figure 11:
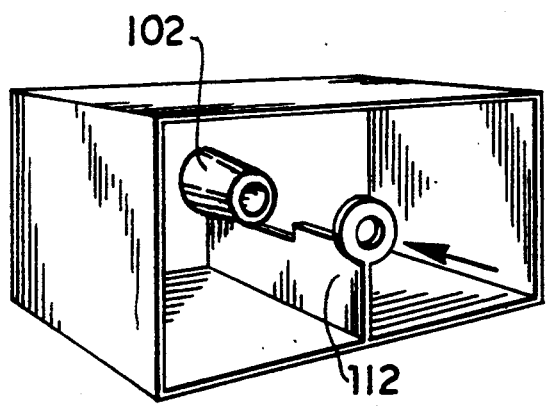
FIG. 11 shows a viewfinder in accordance with still another embodiment of the invention.

FIG. 10 shows a viewfinder 100 having a truncated conical tubular body 102 (cone) which extends from the front window 38, where its exit end is located, part way towards the rear window 104. In the rear window is provided by a framing aperture 106 which is rectangular and a disc 108 having a central circular aperture 110, the center of which is along the central axis 66 which is also the axis of the truncated cone 102. If the rear window is entirely open (equal in size to the distance between the top and bottom walls and the side walls of the framing aperture), then the disc may be supported in the center of the back window and mounted on the same rib 112 as supports the conical tubular body 102. The latter configuration is shown in FIG. 11.

Figure 12:
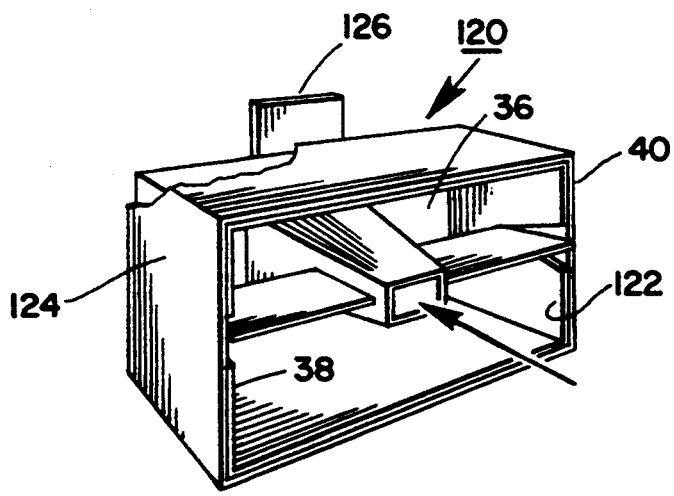
FIG. 12 shows a viewfinder in accordance with still another embodiment of the invention which may be used with a camera having a zoom lens.

Referring to FIG. 12 there is shown a viewfinder 120 having a framing aperture 122 having internal movable walls which are disposed in telescoping relationship with the walls 124 which define the framing aperture 122. These internal walls may be coupled to a zoom lens as via a tab 126 or manually extended or retracted with the tab 126 so that the front window can be extended outwardly, allowing the field of view angle to correspond to the angular coverage of the selected focal length of the zoom lens, as it is moved. A linkage or gear coupling may be used between the telescoping internal walls of the viewfinder's framing aperture and the zoom lens.

From the foregoing description it will be apparent that there has been provided an improved viewfinder, especially suitable for use in compact cameras and which does not require lenses or other refracting elements. Variations and modifications in the herein described viewfinder, within the scope of the inventions and other applications thereof which are also within the scope of the invention, will undoubtedly suggest themselves to those skilled in the art. Accordingly the foregoing description should be taken as illustrative and not in a limiting sense.

We claim:

1. A lensless viewfinder for a camera, having a body and an optical element, for use by a photographer in taking a picture of an object or scene in object space in front of the camera, in a frame, which viewfinder comprises means for presenting to a pupil of an eye of the photographer when the camera is pointed towards said object space a view perimeter of which is the perimeter of the frame of said picture, means for blocking a portion of said view which becomes virtually imperceptible when said camera is pointed to bring the center of said frame along the line of sight between said pupil and the object or scene, and said viewfinder having front and rear windows respectively closer to and further from the object, said front window defining said perimeter of said frame when said pupil is located along said line of sight rearwardly of said rear window along said line of sight at a design position where said blocking means becomes virtually imperceptible.

2. The viewfinder according to claim 1 wherein said lens has an axis which is disposed along said line of sight so that the center of the frame of the picture coincides with the center of said frame as viewed through said viewfinder at a predetermined cross-over point of said line of sight and said axis in said object space.

3. A viewfinder according to claim 2 wherein said blocking means includes a generally tubular member within said viewfinder, said viewfinder having a length along said line of sight and said tubular member having a length which is a substantial portion of the length of said viewfinder, said tubular member having at least one wall tapering inwardly along an axis extending into said object space and to the pupil of the photographer's eye, said at least one wall being symmetrically disposed with respect to said axis, and said at least one wall becoming virtually imperceptible when said axis is disposed along said line of sight.

4. The viewfinder according to claim 1 wherein said blocking means includes a generally tubular member within said viewfinder, said member having a least one wall tapering inwardly along an axis extending into said object space and to the pupil of the photographer's eye, said at least one wall being symmetrically disposed with respect to said axis and said at least one wall becoming virtually imperceptible when said axis is disposed along said line of sight, and said viewfinder having its length along said axis and said tubular member defining a body having a length which is a substantial portion of the length of said viewfinder.

5. The viewfinder according to claim 4 wherein at least one wall extended inwardly defines an apex disposed at said design position along said axis where said pupil is located while viewing said object space.

6. The viewfinder according to claim 4 wherein said viewfinder has sides defining a rectangular aperture providing said front and rear windows, and wherein said member is disposed in said rectangular aperture between said windows.

7. The viewfinder according to claim 6 wherein the length of said member measured along said axis is equal to the length of said viewfinder which is the distance between said front and rear windows.

8. The viewfinder according to claim 6 wherein said member measured along said axis is less in length than the length of said viewfinder which is the distance between said front and rear windows.

9. The viewfinder according to claim 6 wherein said member has an entrance end facing said pupil and an exit end facing said object space, said exit end being disposed approximately in said window and defining edges spaced from said perimeter to define a gap between said exit end and said window, said gap forming a reticle to assist in framing the picture.

10. The viewfinder according to claim 6 wherein said member has an entrance end and an exit end and an entrance end respectively facing said object space and said pupil respectively said walls at said entrance end being of width and height which are up to about one-half the width and heighth thereof at said exit end.

11. The viewfinder according to claim 1 wherein said frame has a certain aspect ration of width to height and said blocking means includes a generally tubular member within said viewfinder, said viewfinder having a length along said line of sight and said tubular member having a length which is a substantial portion of the length of said viewfinder, said tubular member having walls tapering inwardly along an axis extending into said object space to the pupil of the photographer's eye, a cross section through said walls perpendicular to said axis defining a rectangle having a width to height ratio equal to said aspect ratio, said walls becoming virtually imperceptible when said axis is disposed along said of sight and said pupil is spaced from said rear window along said axis at said design position where said walls become virtually imperceptible so as to accurately define the frame of the picture.

12. The viewfinder according to claim 11 wherein the said walls extended inwardly define an apex at said design position where said pupil is located while viewing said object space.

13. The viewfinder according to claim 1 wherein said frame presenting means is defined by rectangular sides having height, length and width dimensions, said height and width dimensions defining said frame and said length dimension being along the width of the camera which defines the thickness thereof and which is in the direction of said object space when taking pictures, said width of said sides being no greater than the width of said camera.

14. The viewfinder according to claim 13 wherein said width of said sides is from about 1½ to 1 inch.

15. The viewfinder according to claim 13 wherein said viewfinder has a back wall which has an opening, said blocking means is a conical, tubular member, said member has entrance and exit ends respectively facing said pupil and said object space, said back wall opening framing said entrance end.

16. The viewfinder according to claim 15 wherein said member has a central axis disposed along said line of sight and walls which taper inwardly toward said entrance end thereof, a cross section perpendicular to said central axis is a rectangle at said entrance end, said exit end being spaced from said back wall and being framed by said opening in said back wall when observed therethrough.

17. The viewfinder according to claim 15 wherein said member is a truncated conical tube open at said exit and entrance ends, said tube having an axis along said line of sight, a disc disposed in said opening in said back wall having a circular opening with a center coincident with said axis, said sides defining a front window facing said object space, and said exit end of said tube extending to said front window.

18. The viewfinder according to claim 13 wherein said side walls define rectangular front and back windows respectively facing said object space and said pupil, said blocking means comprising a truncated conical tube having entrance and exit ends, said tube tapering inwardly towards a central axis which is disposed along said line of sight from said exit end to said entrance end, said exit end being located in said front window, said entrance end being disposed between said front and rear windows, a disc having an aperture with a center, said disc being disposed in said back window with the center thereof coincident with said central axis of said tube.

19. The viewfinder according to claim 13 wherein said optical element is a zoom lens, and said side walls comprise telescoping walls movable forwardly and backwardly along said axis toward and away from said object space correspondingly to the movement of said zoom lens.

20. A lensless viewfinder for a camera, having a body and an optical element for use by a photographer in taking a picture of an object or scene in object space in front of a camera, in a frame, which viewfinder comprises means for presenting to a pupil of an eye of the photographer when the camera is pointed toward said object space a view a perimeter of which is the perimeter of the frame of said picture, means for blocking a portion of said view which becomes virtually imperceptible when the camera is pointed to bring the center of said frame along the line of sight between said pupil and the object or scene, said viewfinder having front and rear windows respectively closer and further from the object or scene, said front window defining said parameter of said frame, and wherein said blocking means comprises a pair of plates of thickness much smaller than the width of said windows and disposed orthogonal to each other within said viewfinder, the intersection of which is along the line coincident with said line of sight, which line is contained within said viewfinder.

21. The viewfinder according to claim 20 wherein said viewfinder has sides defining a rectangular aperture having said front and rear windows facing said object space and the pupil of the photographer's eye respectively, said plates extending between said sides from said front to said rear windows so as to be as long as said viewfinder along a thickness dimension thereof between said front and rear windows.

* * * * *